United States Patent
Liu et al.

(10) Patent No.: US 11,651,234 B2
(45) Date of Patent: May 16, 2023

(54) METHOD, DEVICE AND SYSTEM FOR ESTIMATING CAUSALITY AMONG OBSERVED VARIABLES

(71) Applicant: NEC CORPORATION, Tokyo (JP)

(72) Inventors: Chunchen Liu, Beijing (CN); Lu Feng, Beijing (CN); Wenjuan Wei, Beijing (CN)

(73) Assignee: NEC CORPORATION, Tokyo (JP)

(*) Notice: Subject to any disclaimer, the term of this patent is extended or adjusted under 35 U.S.C. 154(b) by 1185 days.

(21) Appl. No.: 16/140,880

(22) Filed: Sep. 25, 2018

(65) Prior Publication Data

US 2019/0102680 A1     Apr. 4, 2019

(30) Foreign Application Priority Data

Sep. 30, 2017   (CN) .......................... 201710917705.3

(51) Int. Cl.
*G06N 5/02*     (2006.01)
*G06F 16/901*   (2019.01)

(52) U.S. Cl.
CPC .......... *G06N 5/02* (2013.01); *G06F 16/9024* (2019.01); *G06F 2216/03* (2013.01)

(58) Field of Classification Search
CPC ............................... G06N 5/02; G06F 2216/03
See application file for complete search history.

(56) References Cited

U.S. PATENT DOCUMENTS

| | | | |
|---|---|---|---|
| 9,559,914 B1* | 1/2017 | Groenewald | G06N 20/00 |
| 2015/0360052 A1* | 12/2015 | Martin | G06F 16/56 |
| | | | 378/65 |

OTHER PUBLICATIONS

Xiang, Jing, and Seyoung Kim. "A\Ast Lasso for Learning a Sparse Bayesian Network Structure for Continuous Variables." Advances in neural information processing systems. 2013. (Year: 2013).*

Winship, Christopher, and Stephen L. Morgan. "The estimation of causal effects from observational data." Annual review of sociology (1999): 659-706. (Year: 1999).*

* cited by examiner

*Primary Examiner* — Kevin W Figueroa
(74) *Attorney, Agent, or Firm* — Sughrue Mion, PLLC (57) ABSTRACT

A method, device and system for estimating causality among observed variables are provided. In response to receiving observation data of a plurality of observed variables, a causality objective function is determined, based on fitting inconsistencies when fitting is performed using the observed variables and a sparse constraint for a causal network structure. The fitting inconsistencies are adjusted based on weighting factors of the observed variables, wherein a weighting factor of an observed variable indicates a minimum underestimate value of cost required for fitting a target variable using all other observed variables than the above observed variable. Then, the causality among the plurality of observed variables is estimated by using the observations data to optimally solve the causality objective function through sparse causal reasoning under a directed acyclic graph constraint.

13 Claims, 8 Drawing Sheets

METHOD, DEVICE AND SYSTEM FOR ESTIMATING CAUSALITY AMONG OBSERVED VARIABLES

FIELD

The present disclosure generally relates to the field of data mining, and more specifically, relates to a method, device and system for estimating causality among observed variables.

BACKGROUND

In the big data era, a large amount of data can be obtained in various data acquisition manners. Various types of useful information can be acquired through performing data analysis and mining on these data. However, in many application fields, only empirical understanding can be acquired because people cannot have a deep insight into the complicated underlying mechanism and operation process of the system but can only see the appearance of the system.

The causal structure learning focuses on restoring automatically the complicated underlying operation mechanism of the system and reproducing the data generation procedure based on observed data. At present, the causal structure learning technology has been already applied to multiple fields, such as pharmacy, manufacture, market analysis and the like, so as to have a deep insight into the essence of the system, further guide decision-making and create value.

In the causal structure learning, various types of models can be used, wherein the commonly used models includes, for example, structural equation model, Boolean satisfiablity causal model and Bayesian network causal model.

The structural equation model is a popular method applied to the causal structure learning at present, and for example, a LiNGAM model, CAM model, ANM model and the like, which all belong to the structural equation model. However, this type of model relies on a heuristic method to learn causal sequence knowledge, thereby causing an accuracy loss of the causal structure learning.

The Boolean satisfiablity causal model is a new method of causal structure learning proposed in recent year, which accurately determines the causal structure based on Boolean logic reasoning. However, the type of method is constrained by the logic reasoning complexity problem, and cannot be applied to observe complicated causal structure learning with a higher observed variable dimension due to poor learning timeliness.

The Bayesian network causal model is another method used widely. The legacy Bayesian causal learning supports a high accuracy solution of the causal structure using an accurate reasoning algorithm. The legacy Bayesian network causal model is only suitable for the causality learning with an intermediate or low dimension, but hardly adapted to complicated causal structure learning with a high dimension. In addition, due to its poor timeliness in the course of reasoning, an additional algorithm is often required to accelerate the reasoning procedure.

Figure 1:
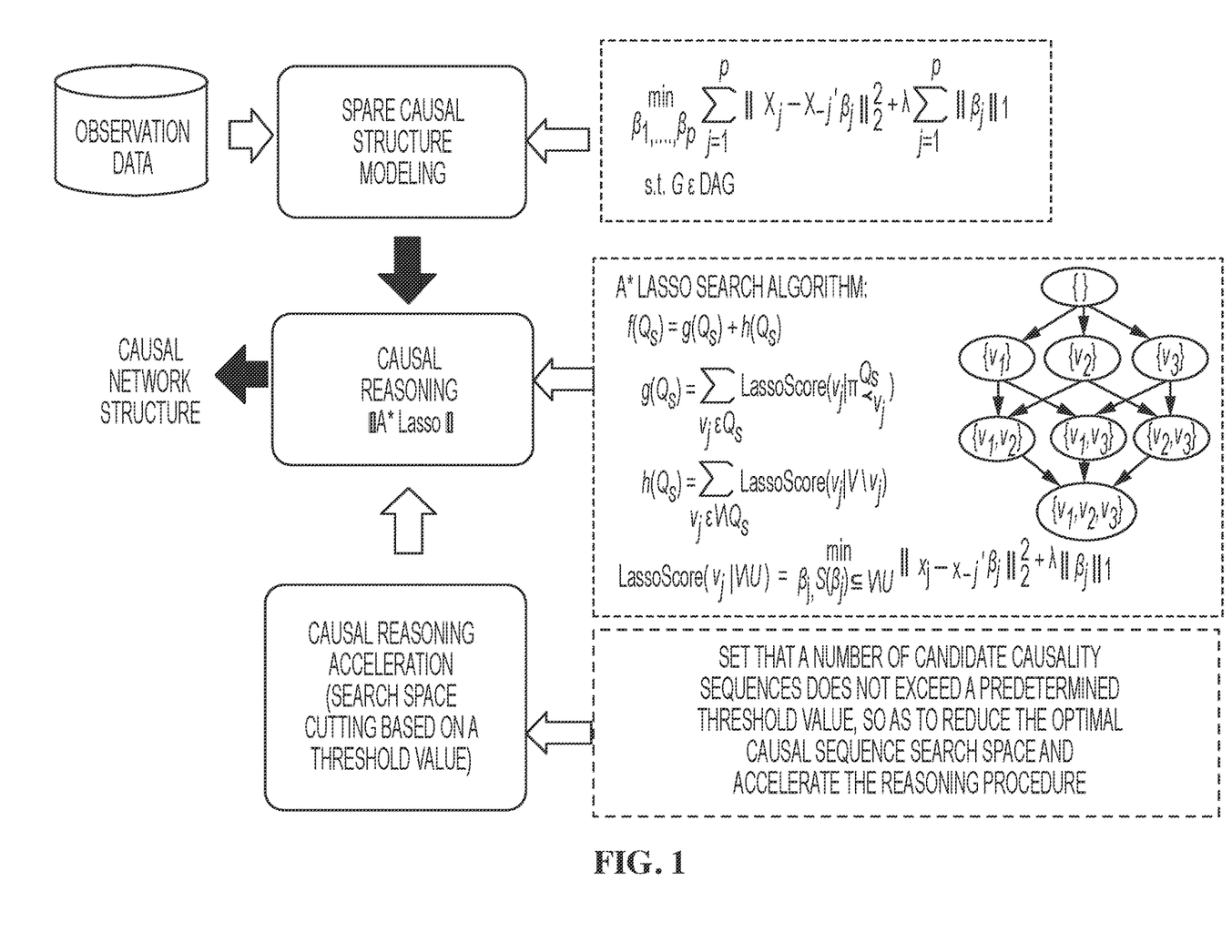

In "A* Lasso for Learning a Sparse Bayesian Network Structure for Continuous Variables" by Jing Xiang, Seyoung Kim, et al., a manner of performing causal reasoning using an A* Lasso algorithm was proposed. As illustrated in FIG. 1, the solution includes first receiving observation data, then modeling a sparse causal structure based on fitting inconsistencies when fitting is performed using observed variables and a sparse constraint, and performing causal reasoning using an A* Lasso search. Besides, by setting a threshold value of a number of causal sequences, the search space of an optimal causal sequence search can be narrowed and the causal reasoning can be accelerated.

However, the existing causal modeling methods are very sensitive to estimation errors of various observed variables, and the accuracy of the causal structure learning is remarkably reduced when there is a big deviation in value magnitudes of the observed variables or there is an error in estimation of the variables. Moreover, the existing reasoning algorithm is temporally complicated, being unable to support complicated causal structure learning with a high observed variable dimension.

As such, there is a need of a new solution for estimating causality among observed variables in the art.

SUMMARY

In view of the above, the present disclosure provides a method, device and system for estimating causality among observed variables, so as to eliminate or alleviate at least partly the problems in the prior art.

In accordance with a first aspect of the present disclosure, there is provided a method for estimating causality among observed variables. In the method, in response to receiving observation data of a plurality of observed variables, a causality objective function for the plurality of observed variables is determined, based on fitting inconsistencies when fitting is performed using the observed variables and a sparse constraint of a causal network structure of the observed variables. Particularly, the fitting inconsistencies are adjusted based on weighting factors of the observed variables, and a weighting factor of an observed variable indicates a minimum underestimate value of cost required for fitting a target variable using all other observed variables than the observed variable. Then, the causality among the plurality of observed variables is estimated by using the observations data to optimally solve the causality objective function for the plurality of observed variables through sparse causal reasoning under a directed acyclic graph constraint.

In accordance with a second aspect of the present disclosure, there is provided a device for estimating causality among observed variables. The device can comprise: an objective function determining module and a causal reasoning module. The objective function determining module is configured for, in response to receiving observation data of a plurality of observed variables, determining a causality objective function for the plurality of observed variables, based on fitting inconsistencies when fitting is performed using the observed variables and a sparse constraint for a causal network structure of the observed variables. Particularly, the fitting inconsistencies are adjusted based on weighting factors of the observed variables, wherein a weighting factor of an observed variable indicates a minimum underestimate value of cost required for fitting a target variable using all other observed variables than the observed variable. The causal reasoning module is configured for estimating the causality among the plurality of observed variables by using the observations data to optimally solve the causality objective function for the plurality of observed variables through sparse causal reasoning under a directed acyclic graph constraint.

In accordance with a third aspect of the present disclosure, there is provided a system for estimating causality among observed variables. The system can comprise: a processor and a memory having one or more computer program codes stored therein, which, when executed by the processor, causes the processor to perform steps of the method in accordance with the first aspect of the present disclosure.

In accordance with a fourth aspect of the present disclosure, there is provided a computer readable storage medium having computer program codes stored therein, which, when executed by a processor, causes the computer device to perform steps of the method in accordance with the first aspect of the present disclosure.

In accordance with a fifth aspect of the present disclosure, there is provided a computer program product having computer program codes stored thereon, which, when loaded to a computer device, causes the computer device to perform steps of the method in accordance with the first aspect of the present disclosure.

In the embodiments of the present disclosure, by means of adjustment to fitting inconsistencies using weighting factors of observed variables a difference among value magnitudes of observed variables is remarkably decreased and thus a sensitivity caused by an observed variable estimation error can be reduced. In a further embodiment, a search space cutting technology based on a variable group sequence relationship can be used to further cut the search space, thereby solving the optimization problem more quickly.

BRIEF DESCRIPTION OF THE DRAWINGS

The above and other objectives, features, and advantages of example embodiments of the present disclosure will become more apparent, through the detailed description on embodiments described herein with reference to the accompanying drawings, in which the same reference symbols generally represent the same components, wherein FIG. 1 schematically illustrates a solution of estimating causality in the prior art.

DETAILED DESCRIPTION OF EMBODIMENTS

Various example embodiments of the present disclosure will be described below in detail with reference to the accompanied drawings. It would be appreciated that these drawings and description are merely provided as preferred example embodiments. It is noted that alternative embodiments of the structures and methods as disclosed herein are easily conceivable based on the following description, and these alternative embodiments can be used without departing from the principles of the present disclosure.

It would be appreciated that description of these embodiments is merely to enable those skilled in the art to better understand and further implement example embodiments disclosed herein, and is not intended for limiting the scope disclosed herein in any manner. Besides, for the purpose of description, the optional steps, modules and the like are denoted in dashed boxes in the drawings.

As used herein, the terms "include/comprise/contain" and its variants are to be read as open-ended terms, which mean "include/comprise/contain, but not limited thereto." The term "based on" is to be read as "based at least in part on." The term "an embodiment" is to be read as "at least one example embodiment;" and the term "another embodiment" is to be read as "at least one further embodiment." Other definitions of terms would be included hereinafter.

As described above, the existing causal modeling method is quite sensitive to estimation errors of different observations variables, and an accuracy of causal structure learning is significantly reduced when there is a big deviation in the value magnitudes of the observed variables or there is an error for variable estimation. In addition, the existing reasoning algorithms are unable to support complicated causal structure learning with a high observed variable dimension, due to high time complexity thereof.

Therefore, in embodiments of the present disclosure, there are provided a novel method, device and system for estimating causality, so as to at least partly alleviate the above problem. According to the embodiments of the present disclosure, it is proposed to adjust, using weighting factors of observed variables, fitting inconsistencies when fitting is performed using observed variables, wherein a weighting factor of an observed variable indicates a minimum underestimate value of cost required for fitting a target variable using all other observed variables than the observed variable. The sensitivity caused by the error of the observed variable estimation is reduced accordingly. Moreover, a novel causal reasoning procedure is also proposed based thereon so as to solve the objective function of the observed variables, and a new search space cutting method based on a variable group sequence relationship is also provided to accelerate the causal reasoning procedure.

The method, device and system for estimating causality of observed variables according to the present disclosure will be described below with reference to FIGS. 2 to 8. However, it would be noted that the description is provided only for illustration purposes, and the present disclosure is not limited to details provided in the embodiments and drawings.

Figure 2:
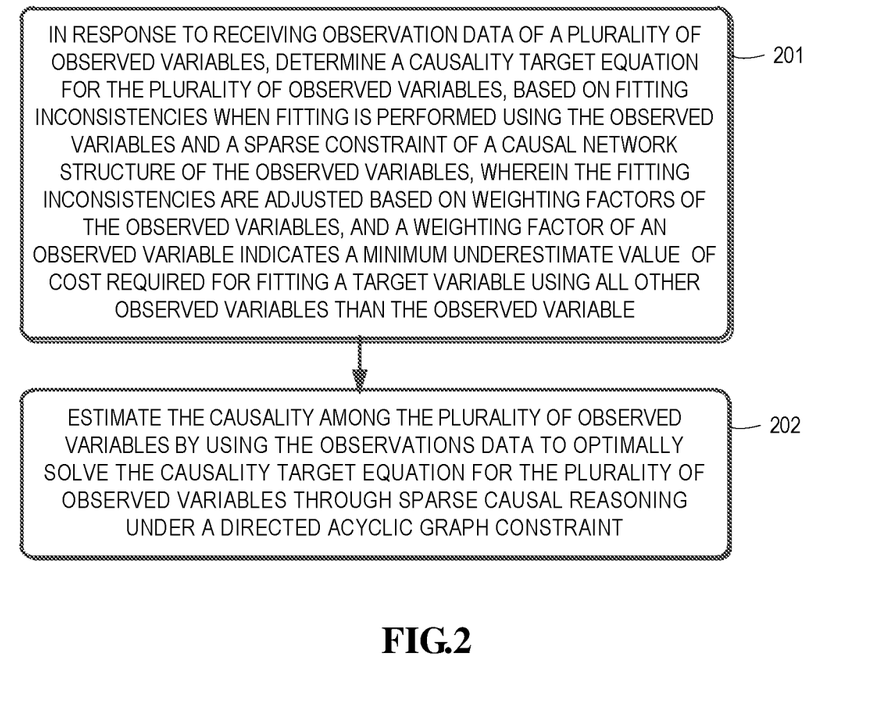
FIG. 2 schematically illustrates a flowchart of a method for estimating causality among observed variables according to an embodiment of the present disclosure.

FIG. 2 schematically illustrates a flowchart of a method of estimating causality among observed variables according to one embodiment of the present disclosure. As illustrated in FIG. 2, first in step 201, in response to receiving observation data of a plurality of observed variables, a causality objective function for the plurality of observed variables is determined based on fitting inconsistencies when fitting is performed using the observed variables and a sparse constraint for a causality network structure of the observed variables. The fitting inconsistencies are adjusted based on weighting factors of the observed variables, wherein a weight factor of an observed variable indicates a minimum underestimate value of cost required for fitting a target variable using all other observed variables than the observed variable.

An observation database can be set, which stores therein system observation data X, $X \in R^{N \times D}$, where X is a matrix of N*D, N is a number of observation samples, and D is a dimension of the observed variable or a number of observed variables. Data in the observation database may be data from a third party or data collected in other manners. Moreover, the data can be pre-processed in advance, by preprocessing such as integration, data reduction, noise reduction, and the like, of the original data. These preprocessing operations are known in the present field, which will not be elaborated herein.

In the embodiments of the present disclosure, when the causality objective function is constructed, a causality objective function for the plurality of observed variables can be configured, based on fitting inconsistencies when fitting is performed using observed variables and a sparse constraint for a causality network structure of the observed variables. However, different from the legacy objective function, in the method as proposed in the present disclosure, the fitting inconsistencies are adjusted using weighting factors of observed variables (which may be also called as variable weighting factors for short), so as to adjust the magnitudes of the fitting inconsistencies into a range of comparable values, thereby lowering the sensitivity caused by the estimation error. An example causality objective function is given below, in which robust modeling is performed for a sparse causality structure using a log likelihood, variable weighting factors and L0 sparse constraint of the observation data.

$$\min_{\beta_1,\ldots,\beta_D} \sum_{j=1}^{D} \frac{\|x_j - x_{-j}\beta_j\|_2^2}{w_j} + \lambda_j \|\beta_j\|_0 \quad \text{(Equation 1)}$$

S.t. $G \in DAG$ wherein, $$w_j = \min_{\beta_j, S(\beta_j) \subseteq V \setminus \{v_j\}} \|x_j - x_{-j}\beta_j\|_2^2 + \lambda'_j \|\beta_j\|_0 \quad \text{(Equation 2)}$$

the first item in the equation is fitting inconsistency adjusted using the variable weighting factor $w_j$, and the second item is a sparse constraint for a causal structure network characterizing causality among observed variables, where,
$x_j \in R^N$ is a vector comprised of N observation values for describing an observed variable $X_j$;
$x_{-j} \in R^{N \times (D-1)}$ indicates all data in the observation data, except the $X_j$ variable, and each column in the matrix corresponds to a respective variable $X_1, \ldots, X_{j-1}, X_{j+1}, \ldots, X_D$;
$\beta_j \in R^{D-1}$ is a parameter to be estimated for describing causality strength between the variable $X_3$ and other variables;
$\|A\|_2^2$ indicates squaring an L2 norm of a vector A;
$\|A\|_0$ indicates an L0 norm of a vector A;
the constraint $G \in DAG$ is used for constraining a causal network structure as a directed acyclic graph;
$\lambda_j$ is a hyperparameter for setting a sparse constraint strength when causal estimation is performed for the observed variable $X_j$; and
$w_j$ is a hyperparameter which is a variable weighting factor for reducing sensitivity to estimation error of the observed variable $X_j$.

It can be seen from the above objective function (1) that the fitting inconsistency is adjusted using the variable weighting factor $w_j$, and specifically, a division operation is performed for the original fitting inconsistency and the variable weighting factor. However, it would be noted that adjustment can also be performed in other similar manners so long as a similar effect can be obtained.

Moreover, it can be seen from the Equation (2), the computing of the variable weighting factor is performed using a structure similar to the original objective function (an objective function without variable weighting factor adjustment) to compute a minimum underestimate value of cost required for fitting a target variable using all other variables in a case of not considering the variable $x_j$, but the directed acyclic graph constraint is not used in computing the variable weighting factor, so as to obtain the underestimate value of the cost. However, it is to be noted that the variable weighting factor can be determined in other similar manner so long as the similar effect can be achieved.

By utilizing the variable weighting factor $w_j$, fitting inconsistencies can be converted to have comparable magnitudes, so as to eliminate the sensitivity of the objective function caused by the variable estimation error so that it is more robust.

In addition, it can be also seen from the objective function (1) that the L0 sparse constraint is used therein. However, it would be appreciated that the present invention is not limited thereto, and in practice it is also possible to use an L1 sparse constraint in the objective function (1). It is to be further noted that, when implementing dimensionality reduction, the L1 sparse constraint not only removes factors not related to the target, but also probably removes factors related to the target, thus affecting the accuracy of the sparse dimensionality reduction; in contrast, the L0 sparse constraint can correct the deficiency.

Then, in step 202, the causality among the plurality of observed variables is estimated by optimally solving the causality objective function for the plurality of observed variables under the directed acyclic graph constraint through sparse causal reasoning with the observation data.

As for the above-mentioned causality objective function with the directed acyclic constraint, a legacy method can be employed to convert it into an optimal causal sequence recursive solving problem. In an embodiment according to the present disclosure, the converted recursive problem can be described as follows:

$$OptScore(U) = \min_{v_j \in U} OptScore(U \setminus v_j) + BestScore(v_j \mid V \setminus U) \quad \text{(Equation 3)}$$

$$\pi_1^U = \operatorname*{argmin}_{v_j \in U} OptScore(U \setminus v_j) + BestScore(v_j \mid V \setminus U),$$

$$BestScore(v_j \mid V \setminus U) = FoBaScore(v_j \mid V \setminus U) \quad \text{(Equation 4)}$$

$$= \min_{\beta_j, S(\beta_j) \subseteq V \setminus U} \frac{\|x_j - x_{-j}\beta_j\|_2^2}{w_j} + \lambda_j \|\beta_j\|_0$$

wherein, V indicates a set of all observed variables, U indicates a set of observed variables having not been sorted, and $\pi_1^U$ indicates a variable belonging to the variable set U and ranked first in a causal sequence. $S(\beta_i)$ indicates a support set of vectors $\beta_j$.

In order to solve the causal sequence recursive solving problem as described in the Equation (3), the present disclosure extends the legacy A* search algorithm and provides a new extended A* search algorithm. The extended A* search algorithm is also referred to as an A* FoBa algorithm for searching an optimal causal sequence generation path in a causal sequence diagram space, herein.

According to the A* FoBa algorithm, an $f$ function can be expressed as follows:

$$f(Q_s)=g(Q_s)+h(Q_s) \quad \text{(Equation 5)}$$

wherein, $g(Q_s)$ indicates a cost consumed from a starting node via the node $Q_s$ to the current node, and $h(Q_s)$ indicates a predicted cost from the current node to the target node, and wherein $g(Q_s)$ and $h(Q_s)$ can be computed through the following equation, respectively:

$$g(Q_s) = \sum_{x_j \in Q_s} FoBaScore\left(x_j \mid \prod_{<v}^{Q_s}\right) \quad \text{(Equation 6)}$$

$$h(Q_s) = \sum_{x_j \in V/Q_s} FoBaScore(x_j \mid V/\{x_j\})$$

$$FoBaScore(x_j \mid S) = \min_{\beta_j, supp(\beta_j) \subseteq S} \frac{\|x_j - x_{-j}\beta_j\|_2^2}{w_j} + \lambda_j \|\beta_j\|_0$$

It would be noted that, in order to ensure that the optimal solution can be found through the extended A* search algorithm, the h( ) function should satisfy two characteristics: consistency and admissibility. Wherein, as for the consistency, the h( ) function will satisfy the consistency, if $h(Q_s) \leq h(Q_s')+FoBaScore(x_j|Q_s)$ is true, for any two arbitrary nodes $Q_s$ and $Q_s'$, $Q_s'=[Q_s,x_j]$. The admissibility means that the estimation $h(Q_s)$ of the cost required from the current node $Q_s$ to the target node should be an underestimation of the real cost.

It can be seen from the Equation (6) that, in the A* FoBa search algorithm, the h function and the g function are different from those in the legacy A* search algorithm, and determine a cost consumed from a starting node to the current node (g function) and a predicted cost from the current node to the target node (h function), based on the fitting inconsistencies adjusted by variable weighting factors and the sparse constraint for the causal network structure of the observed variables.

An example flow of the A* FoBa search method according to the present disclosure will be described below with reference to FIG. 3.

Figure 3:
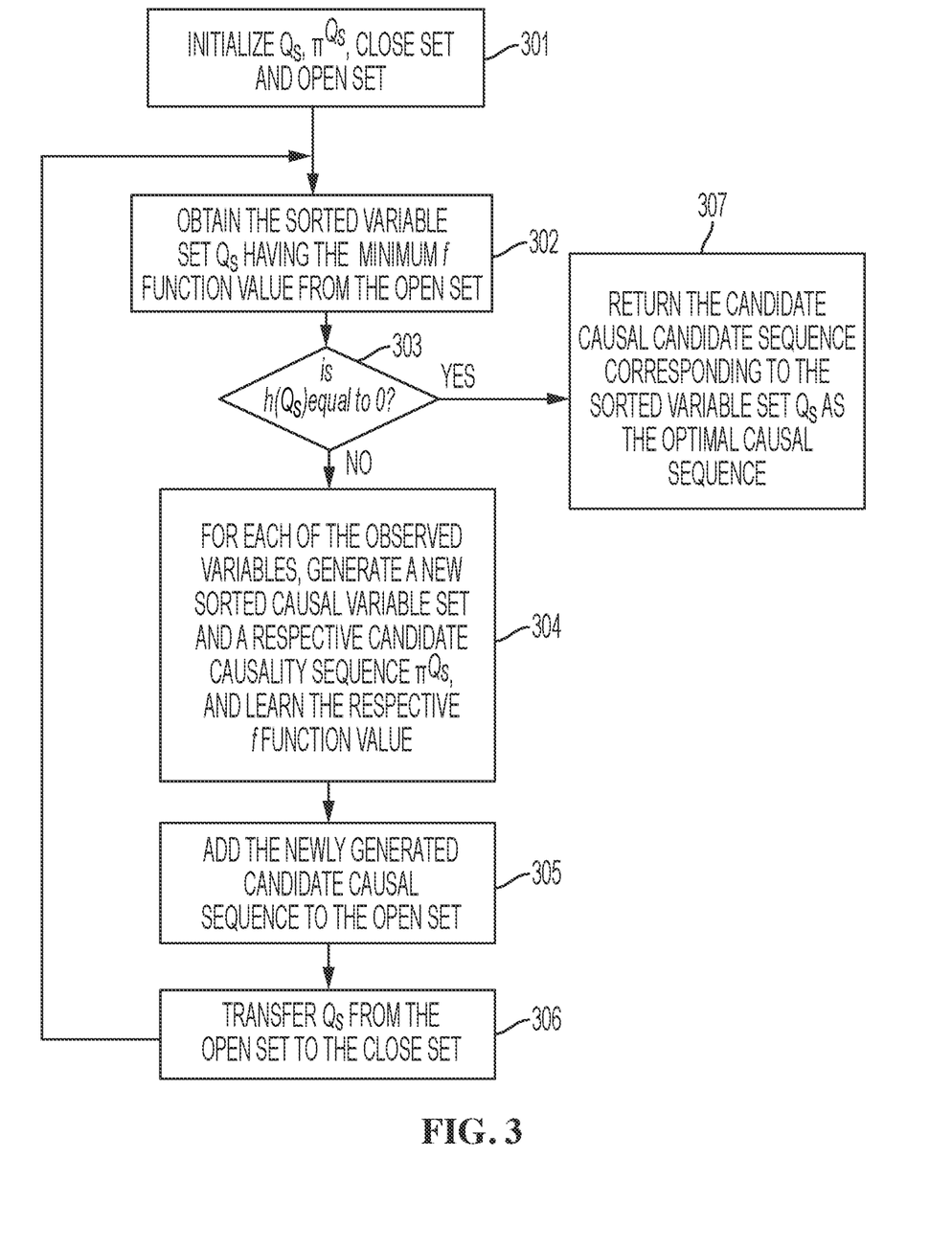
FIG. 3 schematically illustrates a flowchart of a method for sparse causality reasoning according to an embodiment of the present disclosure.

Referring to FIG. 3, an initialization operation is first performed in step 301. Specifically, initialization is performed for a causal sequence set CLOSE, a sorted variable set $Q_s$, a candidate causal sequence $\Pi^{Q_s}=[\ ]$ and a causal sequence set OPEN.

The causal sequence set CLOSE is provided for storing a set of sorted sequences based on which new candidate causal sequences are already generated, the set of sorted sequences can be initialized as an empty set during initialization. The sorted variable set $Q_s$ is a set of sorted variables, and can be initialized as an empty set during initialization. The candidate causal sequence $\Pi^{Q_s}=[\ ]$ is a candidate sequence of sorted variables. The causal sequence set OPEN can be in the following form:

$$OPEN=\{(Q_s, f(Q_s), \Pi^{Q_s}=[\ ]\} \quad \text{(Equation 7)}$$

wherein $Q_s$ is a set of sorted variables, $f(Q_s)$ is denoted by the above equation (5), and $\Pi^{Q_s}=[\ ]$ is a candidate causal sequence, which can be initialized as:

$$OPEN = \left\{\left(Q_s, f(Q_s) = g(Q_s) + h(Q_s) = \right.\right. \quad \text{(Equation 8)}$$

$$\left.\left. 0 + h(Q_s) = \sum_{i=1}^{D} FoBaScore(x_i \mid V/\{x_i\}), \prod^{Q_s} = [\ ]\right)\right\};$$

Next, in step 302, the sorted variable set $Q_s$ with the minimum $f$ function value is extracted from the OPEN set, and it is determined in step 303 whether the h function of $Q_s$ is 0 or not, i.e., whether a path for reaching the target node has been found. If it is 0, the candidate causal sequence corresponding to the minimum $f$ function value is returned as the optimal causal sequence; otherwise, the method goes to step 304. For an initial execution, there is no sorted variable set in the OPEN set, and at this time, the method goes to step 304 to generate a new set of sorted variables.

In step 304, for each of the observed variables $v \in V \backslash Qs$, a new sorted causality sequence set $Q_s$ and a candidate causal sequence $\Pi^{Q_s}=[Q_s,v]$ are generated, and a respective $f(Q_s')$ is learned by $$f(Q_s')=g(Q_s')+h(Q_s')=g(Q_s)+h(Q_s)+FoBaScore(v|Q_s)- \\ FoBaScore(v|V\backslash\{v\}) \quad \text{(Equation 9)}$$

For initial execution, in a case of $Q_s$ being empty, for each of observed variables v, a new sorted causal set and a respective candidate causal sequence can be generated and a respective $f(Q_s')$ can be learned.

Then, in step 305, the generated candidate causal sequence is added to the OPEN set to update the OPEN set, namely:

$$OPEN=\{(Q_s', f(Q_s'), \Pi^{Q_s'}=[Q_s,v]\}$$

Subsequently, in step 306, the $Q_s$ having the minimum $f$ function value extracted previously is transferred from the OPEN set to the CLOSE set, i.e., the $Q_s$ and its related information are removed from the OPEN set and added to the CLOSE set. The method jumps to step 302 for continuing execution.

The operations in steps 301 to 305 can be repeated until the sorted variable set with the h function being 0 is obtained, and the candidate causal sequence corresponding thereto is returned as the optimal causal sequence.

For illustrative purposes, a brief description will be made with three observed variables as an example. However, it would be appreciated that, in actual practices, a dimension of observed variables might be much higher. For example, for three observed variables $v_1$, $v_2$ and $v_3$, the OPEN set is empty at an initial execution, and at this time, new sorted observed variable sets $\{v_1\}$, $\{v_2\}$ and $\{v_3\}$ are generated for the respective observed variables $v_1$, $v_2$ and $v_3$, so as to obtain respective candidate causal sequences and learning the respective $f(Q_s')$. The generated candidate causal sequences will be placed into the OPEN set. At a second execution, the sorted variable set with the minimum $f$ function value, for example $\{v_2\}$, is found from the three variable sets, the h function value thereof is determined, which is not 0 at this time, and then for example, two sorted sets $\{v_1, v_2\}$ and $\{v_2, v_3\}$ and respective candidate causal sequences $v_2, v_1$ and $v_2, v_3$, as well as respective $f(Q_s')$ are generated. Subsequently, $\{v_2\}$ and its related information are removed from the OPEN set and placed into the CLOSE set. At a third execution, a sequence with the minimum $f$ function, for example $\{v_2, v_3\}$, is further selected from the OPEN set, the sorted set $\{v_1, v_2, v_3\}$ and the respective candidate causal sequence $v_2, v_3, v_1$, as well as the respective $f(Q_s')$ are further generated, and $\{v_2, v_3\}$ and its related information are transferred from the OPEN set to the CLOSET set. At a fourth execution, a sequence with the minimum ƒ function is further selected, it is $\{v_1, v_2, v_3\}$ at this time and its h function is zero. Thus, the respective candidate causal sequence $v_2, v_3, v_1$ can be returned as the optimal causal sequence, so as to complete the search procedure.

Figure 4:
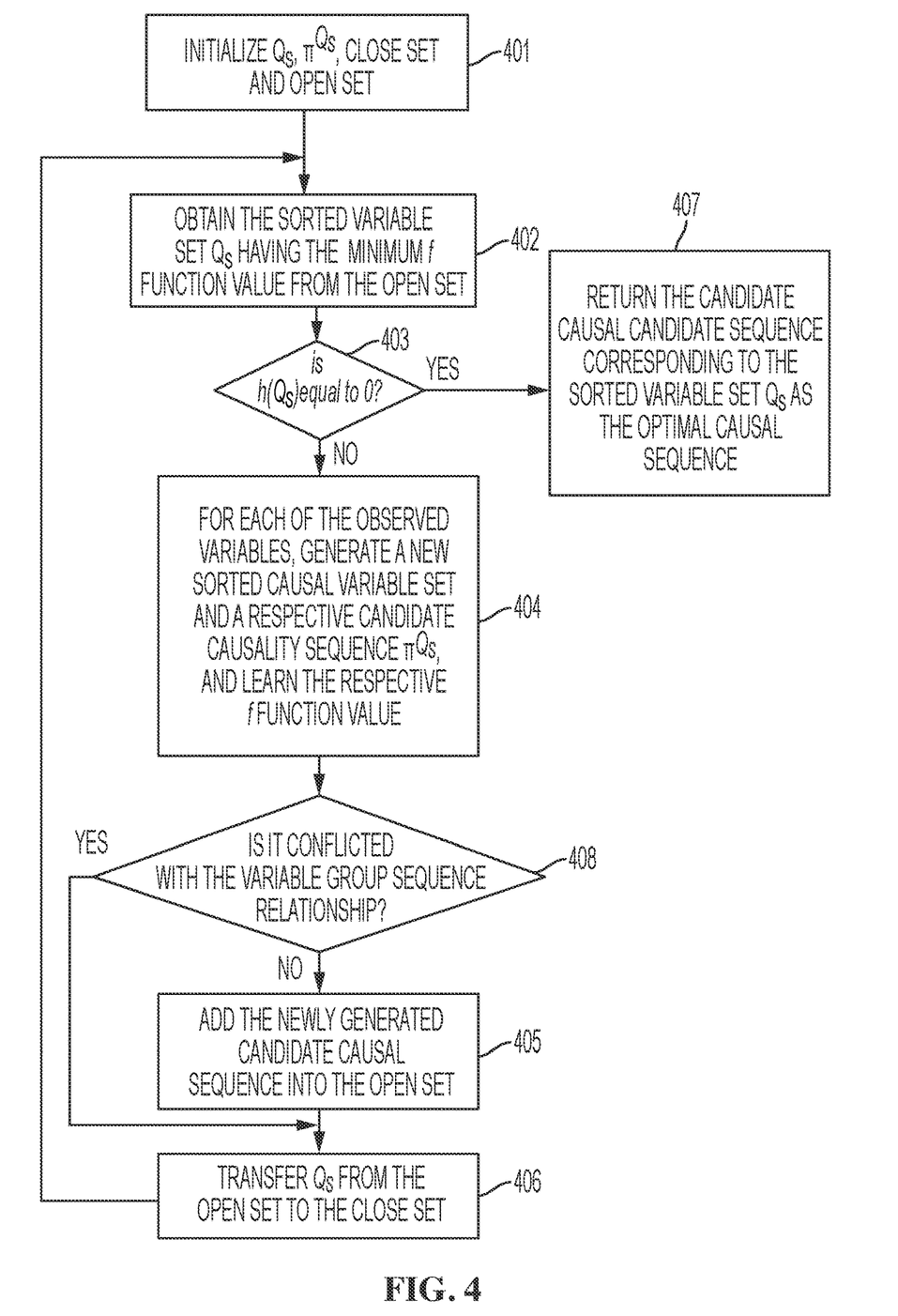
FIG. 4 schematically illustrates a flowchart of a method for sparse causality reasoning according to another embodiment of the present disclosure.

Besides, search space cutting can be used in the search procedure of the iterative operation to accelerate the sparse causality reasoning. Different from the search space cutting based on a threshold value in the prior art, there is proposed a search space cutting based on a variable group sequence relationship in the present disclose. In other words, it is proposed in the present disclosure that the variable group sequence relationship $G_1 \ll G_2 \ll \ldots \ll G_k$ is introduced and the sequence diagram search space is cut with the variable group sequence relationship. FIG. 4 illustrates an example flowchart of an A*FoBa search method in a case of using search space cutting.

Referring to FIG. 4, steps 401 to 407 in FIG. 4 are identical to steps 301 to 307 in FIG. 3 and thus will not be elaborated herein; their difference lies in adding, between steps 404 and 405, a step 408 of search space cutting based on a variable group sequence relationship. After a new sorted causality sequence set $Q_s'$ and a respective candidate causal sequence $\Pi^{Qs'}=[Q_s,v]$ have been obtained in step 404, the candidate causal sequence $\Pi^{Qs'}$ is further checked in step 408 using the variable group sequence relationship, to determine whether it is conflicted with the variable group sequence relationship. If the candidate causal sequence is not conflicted with the variable group sequence relationship, the method moves to step 405 in which the newly generated candidate causal sequence is added to the OPEN set. In turn, if the candidate causal sequence is conflicted with the variable group sequence relation, the method skips over step 405 and perform step 406 directly. In this manner, the search space can be cut to accelerate the optimum solving procedure.

The variable group sequence relationship can be acquired in various manners. For example, the variable group sequence relationship can be specified by an expert in related fields, and for example, for $G_1=\{v_1,v_2\}$, $G_2=\{v_3,v_6\}$ and $G_3=\{v_3,v_5,v_7,v_8\}$, the experts can give the variable group sequence relationship $G_1 \ll G_3 \ll G_2$. In addition, the variable group relationship can also be acquired through automatic learning on the observation data. An example method of automatically learning variable group sequence relationship will be described below with reference to FIG. 5.

Figure 5:
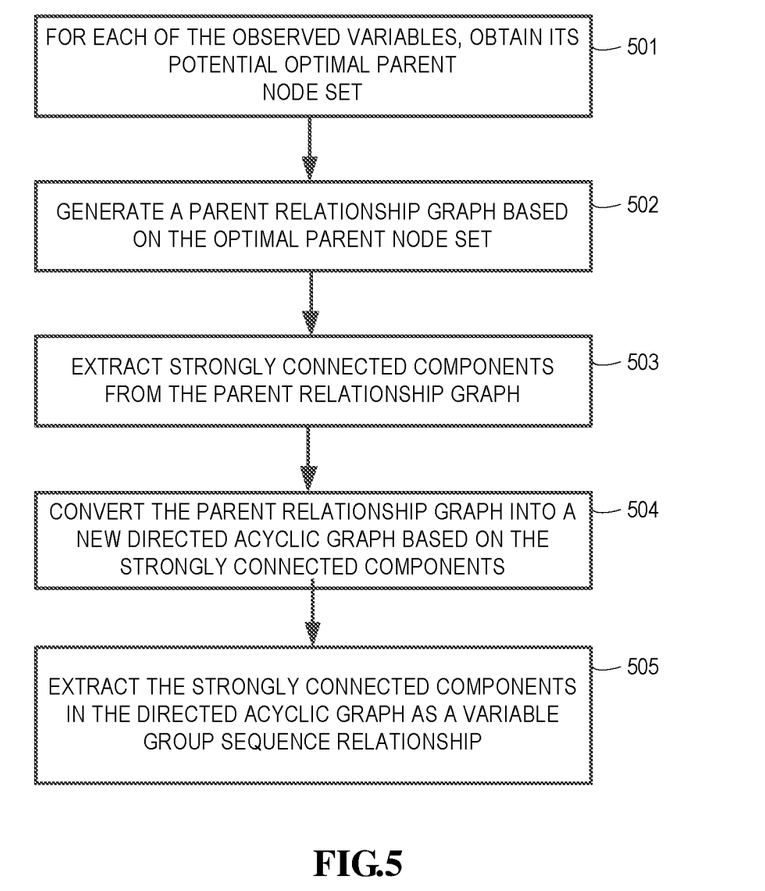
FIG. 5 schematically illustrates a flowchart of a method for generating a variable group sequence relationship according to an embodiment of the present disclosure.

Referring to FIG. 5, first in step 501, for each observed variable $v_i(i\in\{1,\ldots,D\})$, its potential optimal parent node set $POP_i$ can be acquired. Various methods can be used to acquire the potential optimal parent node set of each observed variable. For example, the legacy A* search sparse regression algorithm, A* Lasso search algorithm, and the like, can be used. Moreover, the A* FoBa sparse regression algorithm as provided in the present disclosure can also be used to acquire the set. The specific manner of acquiring the optimal parent node set is known in the art, which will be not elaborated herein.

Figure 6A:
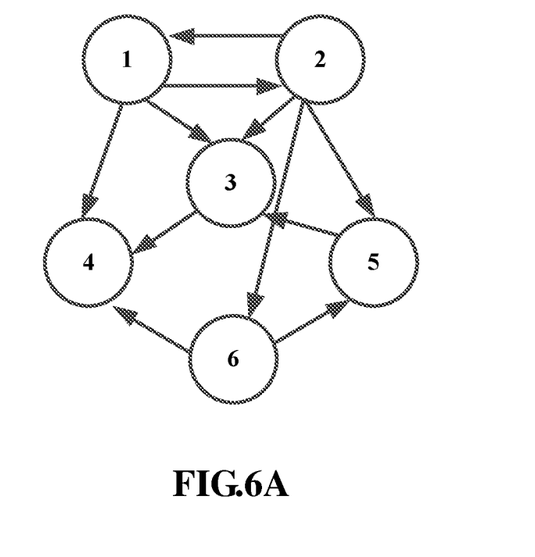
FIGS. 6A to 6C schematically illustrate an example parent relationship diagram, strongly connected components and a new directed acyclic graph in a procedure of generating a variable group sequence relationship according to an embodiment of the present disclosure.

Next, in step 502, a parent relationship diagram is generated based on the optimal parent node set $\{POPS_1, \ldots, POPS_D\}$ acquired in step 501. Specifically, each observed variable can be converted into a node in the diagram, and for each observed variable $V_p \in POPS_i$, an edge directed from $V_p$ to $V_i$ can be generated to describe that $V_p$ is a potential parent node of $V_i$. FIG. 6A illustrates an example of a parent relationship diagram according to an embodiment of the present disclosure, in which 6 variables are involved.

Figure 6B:
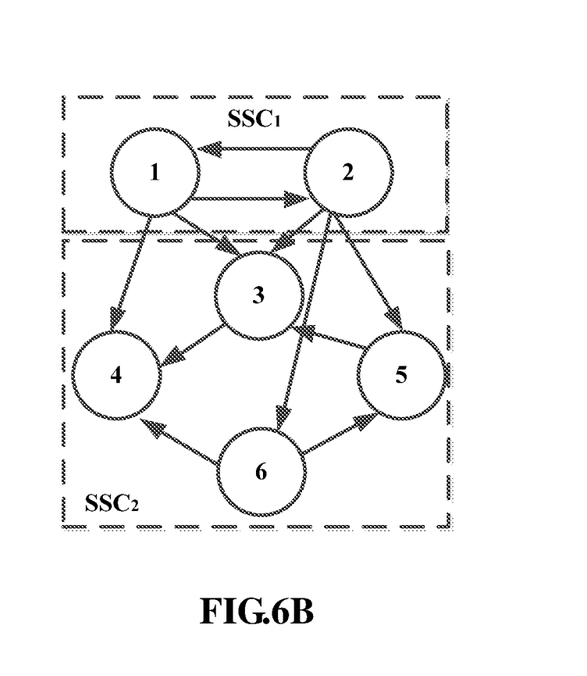

Thereafter, in step 503, strongly connected components (SSCs) are extracted from the parent relationship diagram generated in step 502, and $\{SSC_1, \ldots, SSC_M\}$ is obtained, in which $SSC_1 \cup \ldots \cup SSC_M=\{v_1, \ldots, v_D\}$, i.e., a union of all strongly connected components, is the entire set of the variables. The strongly connected component is a set of nodes that can form a loop circuit and cannot form a loop circuit with other nodes or strongly connected components. FIG. 6B schematically illustrates strongly connected components $SCC_1$ and $SCC_2$ extracted from the parent relationship diagram as illustrated in FIG. 6A.

Figure 6C:
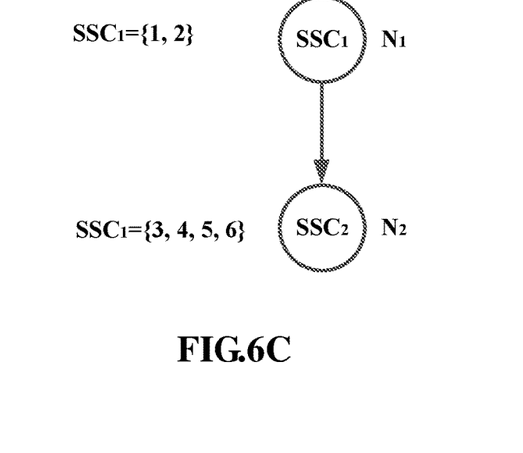

Next, in step 504, the parent relationship diagram in step 502 is converted into a new directed acyclic graph $G_{new}$, based on the generated strongly connected components SSC. An example method includes converting each strongly connected component $SSC_i$ into a new node $N_i$, and if in the parent relationship diagram, there is any node in the $SSC_i$ directed to the node in the $SSC_j$, an edge directed from $N_i$ to $N_j$ is added to the $G_{new}$. FIG. 6C illustrates a new directed acyclic graph generated based on the strongly connected components in FIG. 6B. The two strongly connected components $SSC_1$ and $SSC_2$ in FIG. 6B are converted to two new nodes $N_1$ and $N_2$, respectively. Since there is an edge in $SCC_1$ directed to $SCC_2$ in the parent relationship diagram of FIG. 6A, an edge directed from $N_1$ to $N_2$ is added between two nodes $N_1$ and $N_2$. In this manner, a new directed acyclic graph $G_{new}$ can be obtained.

Finally, in step 505, strongly connected components of the directed acyclic graph are extracted, and its sequence relationship is taken as the variable group sequence relationship. The sequence relationship $SSC_p \ll \ldots \ll SSC_q(|\{p,\ldots,q\}|=M)$ in the directed acyclic graph can be directly obtained, such that the variable group sequence relationship $G_1 \ll \ldots \ll G_M$, $G_1=SSC_p, \ldots, G_M=SSC_q$ is acquired. For example, for the new directed acyclic graph as illustrated in FIG. 6C, $SCC_1 \ll SCC_2$ can be obtained.

In this way, the variable group sequence relationship for performing search space cutting can be obtained. However, it would be appreciated that the present invention is not limited thereto, and any other manner capable of obtaining the variable group sequence relationship is also feasible.

In embodiments of the present disclosure, by means of adjustment to the fitting inconsistencies using weighting factors of observed variables, incomparability of the fitting inconsistencies between different target variables caused by magnitudes of the observed variables can remarkable decreased, and thus the sensitivity resulting from an error of observed variable estimation can be reduced. In a further embodiment, the search space can be cut by using a space cutting technology based on a variable group sequence relationship to accelerate the solving of the optimization problem.

Figure 7:
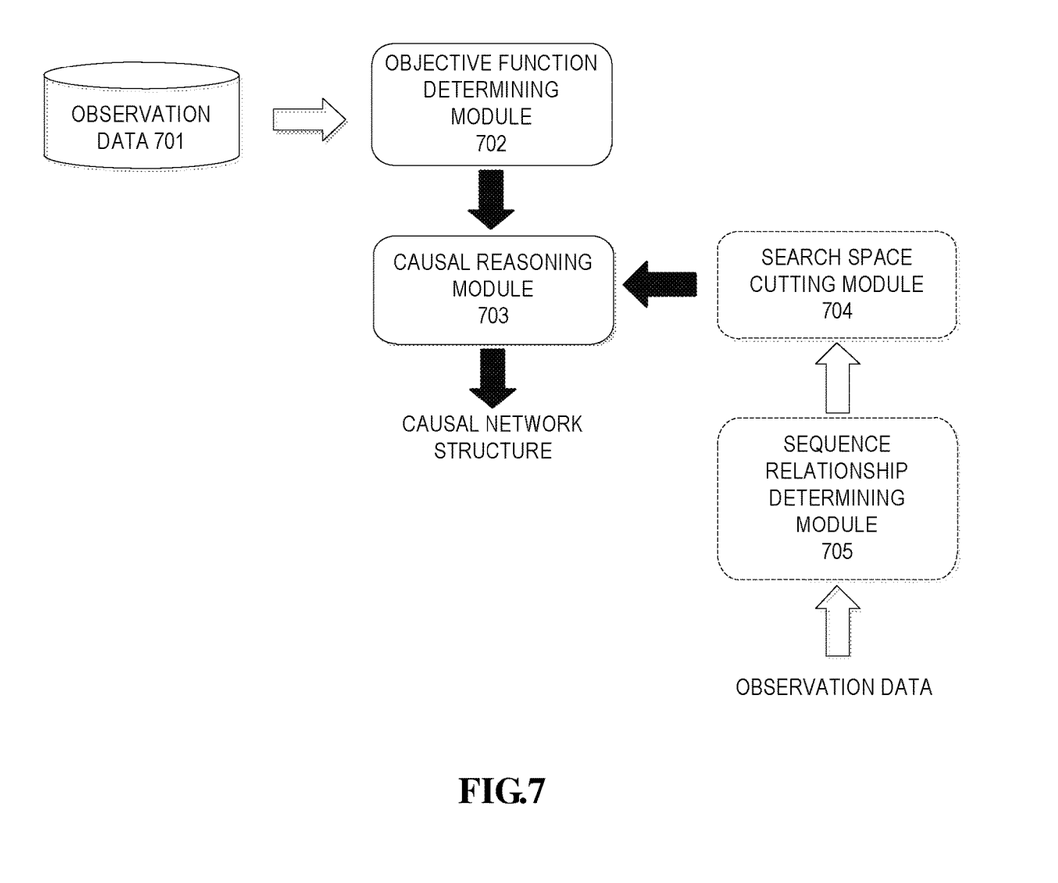
FIG. 7 schematically illustrates a flowchart of a device for estimating causality among observed variables according to an embodiment of the present disclosure.

FIG. 7 illustrates a block diagram of an example device 700 for estimating causality among observed variables according to the present disclosure. As illustrated in FIG. 7, the device 700 includes an objective function determining module 702 and a causal reasoning module 703.

The objective function determining module 702 can be configured, in response to receiving observation data of an observed variable, to determine a causality objective function for the plurality of observed variables, based on fitting inconsistencies when fitting is performed using the observed variables and a sparse constraint for a causal network structure of the observed variables. The fitting inconsistencies are adjusted based on weighting factors of the observed variables, and a weighting factor of an observed variable indicates a minimum underestimate value of cost required for fitting a target variable using all other observed variables than the observed variable. An observation database 701 can be set, which stores therein observation data X, $X \in R^{N \times D}$, wherein X indicates a matrix of N*D, N indicates a number of observation samples, and D indicates a dimension of the observed variables or a number of observed variables. Data in the observation database may be data from a third party or data collected in other manners. Moreover, the data can be preprocessed data.

The causal reasoning module 703 is configured to estimate causality among the plurality of observed variables by using the observation data to optimally solve the causality objective function for the plurality of observed variables through sparse causal reasoning under a directed acyclic graph constraint.

In embodiments of the present disclosure, the causal reasoning module 703 is configured to convert sparse causal reasoning for a variable model of the plurality of observed variables into an optimal causal sequence recursive solving problem. The causal reasoning module 703 can be configured to determine a cost consumed from a starting node to the current node (a value of g function) and a predicted cost from the current node to a target node (a value of h function), based on the adjusted fitting inconsistencies and a sparse constraint for a causal network structure of the observed variables. For the optimal causal sequence recursive solving problem, reference may be made to the above description with reference to FIG. 3.

In an embodiment of the present disclosure, the sparse constraint may be an L0 sparse constraint.

In an embodiment of the present disclosure, the device 700 can further include a search space cutting module 704 which is configured, in a procedure of the optimal causal sequence recursive solving, to determine whether a new candidate causal sequence generated is conflicted with a predetermined variable group sequence relationship, and to discard the generated new candidate causal sequence if it is determined there is a conflict. For search space cutting, one may refer to the above description with reference to FIG. 4.

In an embodiment of the present disclosure, the predetermined variable group sequence relationship may be given by an expert. In another embodiment of the present disclosure, the predetermined variable group sequence relationship can be automatically determined based on observation data.

In another embodiment of the present disclosure, the device 700 can further include a sequence relationship determining module 705. The sequence relationship determining module 705 can be configured to automatically determine the predetermined variable group sequence relationship by: for each of the observed variables, obtaining a potential optimal parent node set thereof; generating a parent relationship graph based on the acquired optimal parent node set; extracting strongly connected components from the parent relationship graph; converting the parent relationship graph into a new directed acyclic graph by converting each of the strongly connected components into a new node and adding a respective edge between the respective new nodes when two strongly connected components are connected in the parent relationship graph; and extracting a sequence relationship between strongly connected components in the directed acyclic graph as the predetermined variable group sequence relationship. For automatically determining the variable group sequence relationship, one may refer to the above description with reference to FIG. 5.

Figure 8:
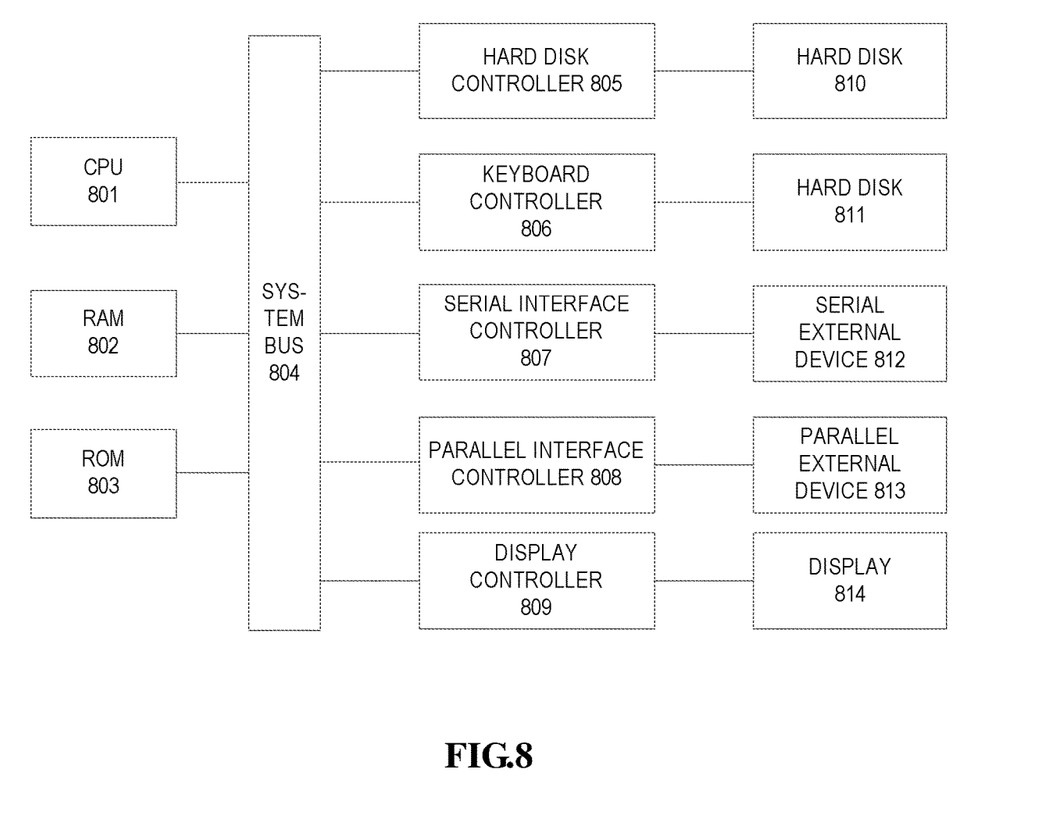
FIG. 8 schematically illustrates a diagram of a system for estimating causality among observed variables according to an embodiment of the present disclosure.

FIG. 8 schematically illustrates a diagram of a system for estimating causality among observed variables according to an embodiment of the present disclosure. A system for implementing causality estimation of the present invention will be described below with reference to FIG. 8.

The computer system as illustrated in FIG. 8 includes a central processing unit (CPU) 801, a random access memory (RAM) 802, a read-only memory (ROM) 803, a system bus 804, a hard disk controller 805, a keyboard controller 806, a serial interface controller 804, a parallel interface controller 808, a display controller 809, a hard disk 810, a keyboard 811, a serial external device 812, a parallel external device 813 and a display 814. Among these devices, connected with the system bus 804 are the CPU 801, the RAM 802, the ROM 803, the hard disk controller 805, the keyboard controller 806, the serial interface controller 807, the parallel interface controller 808 and the display controller 809. The hard disk 810 is connected to the hard disk controller 805, the keyboard 811 is connected to the keyboard controller 806, the serial external device 812 is connected to the serial interface controller 807, the parallel external device 813 is connected to the parallel interface controller 808, and the display 814 is connected to the display controller 809.

The memory can store one or more codes therein which, when executed by the computer, causes the CPU to perform steps of the method as proposed in the embodiments of the present disclosure, for example those embodiments as described above with reference to FIGS. 2 to 6.

It is to be noted that the structural block diagram as illustrated in FIG. 8 is merely provided as an example, rather than limitation on the present disclosure. In some cases, some devices can be added or reduced therefrom according to requirements.

It would be appreciated that the solution as proposed in the present disclosure can be used in various applications, such as pharmacy, manufacture, market analysis, traffic forecast, weather forecast, air quality forecast, and the like, so as to produce advantageous effects.

In addition, the embodiments of the present disclosure can be implemented by software, hardware or a combination of software and hardware. The hardware portion can be implemented using a dedicated logic; and the software portion can be stored in the memory and executed by an appropriate instruction executing system, for example a microprocessor or dedicated design hardware.

Those skilled in the art would appreciate that the foregoing method and device can be implemented using a computer executable instruction and/or a control code contained in the processor, and for example, such code is provided on a carrier medium such as a disk, a CD or DVD-ROM, a programmable memory such as a read only memory (firmware), or a data carrier such as an optical or electronic signal carrier.

The device and components thereof in the present embodiment can be implemented by a hardware circuit such as a large-scale integrated circuit or gate array, a semiconductor such as a logic chip, transistor and the like, or a programmable hardware device such as a field programmable gate array, programmable logic device and the like, or can be implemented by software executed by various types of processors, or can be implemented by a combination of the above hardware circuit and software, for example firmware.

Although the present disclosure has been described with reference to the currently envisioned embodiments, it should be understood that the present disclosure is not limited to the disclosed embodiments. By contrast, the present disclosure is intended to cover various modifications and equivalent arrangements included in the spirit and scope of the appended claims. The scope of the appended claims meets the broadest explanations to cover all such modifications and equivalent structures and functions.

What is claimed is:

1. A method for estimating causality among observed variables, comprising:
in response to receiving observation data of a plurality of observed variables, determining a causality objective function for the plurality of observed variables, based on fitting inconsistencies when fitting is performed using an L2 norm of the observed variables, an L0 norm of a sparse constraint of a causal network structure of the observed variables, and a directed acyclic graph (DAG) constraint, wherein the L2 norm and the L0 norm taken together form a first cost for a first graph under the DAG constraint, wherein the fitting inconsistencies are adjusted based on weighting factors of the observed variables, and wherein a weighting factor of an observed variable indicates a minimum underestimate value of a second cost for a second graph based on the L2 norm and the L0 norm taken together, wherein the second cost is required for fitting a target variable using all other observed variables than the observed variable, and the minimum underestimate value of the second cost is based on no DAG constraint; and
estimating the causality among the plurality of observed variables by using the observations data to optimally solve the causality objective function for the plurality of observed variables through sparse causal reasoning under the DAG constraint.

2. The method of claim 1, wherein the sparse causal reasoning of the causality objective function for the plurality of observed variables is converted into an optimal causal sequence recursive solving problem, and wherein a cost consumed from a starting node to a current node in a sorted causal sequence and a predicted cost from the current node to a target node are determined based on the fitting inconsistencies adjusted with the weighting factors of the observed variables and the sparse constraint for the causal network structure of the observed variables.

3. The method of claim 2, further comprising: in a procedure of the optimal causal sequence recursive solving:
for a new generated candidate causal sequence, determining whether it is conflicted with a predetermined variable group sequence relationship; and
discarding the generated new candidate causal sequence if it is determined that there is a conflict.

4. The method of claim 3, wherein the predetermined variable group sequence relationship is given by an expert in the art.

5. The method of claim 3, wherein the predetermined variable group sequence relationship is automatically determined based on the observation data.

6. The method of claim 5, wherein the predetermined variable group sequence relationship is automatically determined by:
for each of the observed variables, obtaining a potential optimal parent node set thereof;
generating a parent relationship graph based on the acquired optimal parent node set;
extracting strongly connected components from the parent relationship graph;
converting the parent relationship graph into a new directed acyclic graph, by converting each of the strongly connected components into a new node and adding a respective edge between respective new nodes when two strongly connected components have a connectivity in the parent relationship graph; and
extracting a sequence relationship between the strongly connected components in the directed acyclic graph as the predetermined variable group sequence relationship.

7. A system for estimating causality among observed variables, comprising:
a processor; and
a memory having a computer program code stored therein which, when executed by the processor, causes the processor to perform the method of claim 1.

8. A device for estimating causality among observed variables, comprising:
a processor; and
a memory storing executable instructions that, when executed by the processor, causes the processor to perform as:
an objective function determining module configured for, in response to receiving observation data of a plurality of observed variables, determining a causality objective function for the plurality of observed variables, based on fitting inconsistencies when fitting is performed using an L2 norm of the observed variables, an L0 norm of a sparse constraint of a causal network structure of the observed variables, and a directed acyclic graph (DAG) constraint, wherein the L2 norm and the L0 norm taken together form a first cost for a first graph under the DAG constraint, wherein the fitting inconsistencies are adjusted based on weighting factors of the observed variables, and wherein a weighting factor of an observed variable indicates a minimum underestimate value of a second cost for a second graph based on the L2 norm and the L0 norm taken together, wherein the second cost is required for fitting a target variable using all other observed variables than the observed variable, and the minimum underestimate value of the second cost is based on no DAG constraint; and
a causal reasoning module configured for, estimating the causality among the plurality of observed variables by using the observations data to optimally solve the causality objective function for the plurality of observed variables through sparse causal reasoning under the DAG constraint.

9. The device of claim 8, wherein the causal reasoning module is configured for converting the sparse causal reasoning of the causality objective function for the plurality of observed variables into an optimal causal sequence recursive solving problem, and wherein the causal reasoning module is configured for determining a cost consumed from a starting node to a current node in a sorted causal sequence and a predicted cost from the current node to a target node, based on the fitting inconsistencies adjusted with the weighting factors of the observed variables and the sparse constraint for the causal network structure of the observed variables.

10. The device of claim 9, wherein the processor further performs as a search space cutting module configured for, in a procedure of the optimal causal sequence recursive solving:
for a generated new candidate causal sequence, determining whether it is conflicted with a predetermined variable group sequence relationship; and
discarding the generated new candidate causal sequence if it is determined that there is a conflict.

11. The device of claim 10, wherein the predetermined variable group sequence relationship is given by an expert in the art.

12. The device of claim 11, wherein the predetermined variable group sequence relationship is automatically determined based on the observation data.

13. The device of claim 12, wherein the processor further performs as a sequence relationship determining module configured for automatically determining the predetermined variable group sequence relationship by:
- for each of the observed variables, obtaining a potential optimal parent node set there of;
- generating a parent relationship graph based on the acquired optimal parent node set;
- extracting strongly connected components from the parent relationship graph;
- converting the parent relationship graph into a new directed acyclic graph, by converting each of the strongly connected components into a new node and adding a respective edge between respective new nodes when two strongly connected components have a connectivity in the parent relationship graph; and
- extracting a sequence relationship between the strongly connected components in the directed acyclic graph as the predetermined variable group sequence relationship.

\* \* \* \* \*